United States Patent [19]

Varni et al.

[11] 4,107,810
[45] Aug. 22, 1978

[54] MAGNETIC DISC CLEANING MACHINE

[75] Inventors: Anselm Francis Varni, Woodland Hills; Joseph Sandor, Reseda, both of Calif.

[73] Assignee: Innovative Computer Products, Tarzana, Calif.

[21] Appl. No.: 839,280

[22] Filed: Oct. 4, 1977

[51] Int. Cl.² .............................................. G11B 1/04
[52] U.S. Cl. ................................... 15/97 R; 360/137
[58] Field of Search ............... 15/21 R, 21 B, 21 C, 15/97 R, 310, 311; 360/133, 137, 97-99, 105

[56] References Cited
U.S. PATENT DOCUMENTS

| | | | |
|---|---|---|---|
| 3,005,223 | 10/1961 | Taylor et al. | 15/310 |
| 3,150,401 | 9/1964 | Taylor et al. | 15/311 |
| 3,973,273 | 8/1976 | Lissner et al. | 360/133 X |
| 4,001,889 | 1/1977 | Schneider | 360/97 X |

Primary Examiner—Edward L. Roberts

[57] ABSTRACT

This invention relates to a machine for cleaning magnetic discs. The machine is specifically adapted for removing dirt, dust, oils and other undesirable contamination from magnetic disc surfaces and comprises a housing having means for receiving the magnetic disc. A cleaning assembly is disposed in the housing and includes at least one arm member having an associated cleaning pad and means for selectively moving the arm member and cleaning pad across the disc such that as the cleaning pad is moved, it engages the surface of the disc and removes the undesirable material therefrom.

20 Claims, 7 Drawing Figures

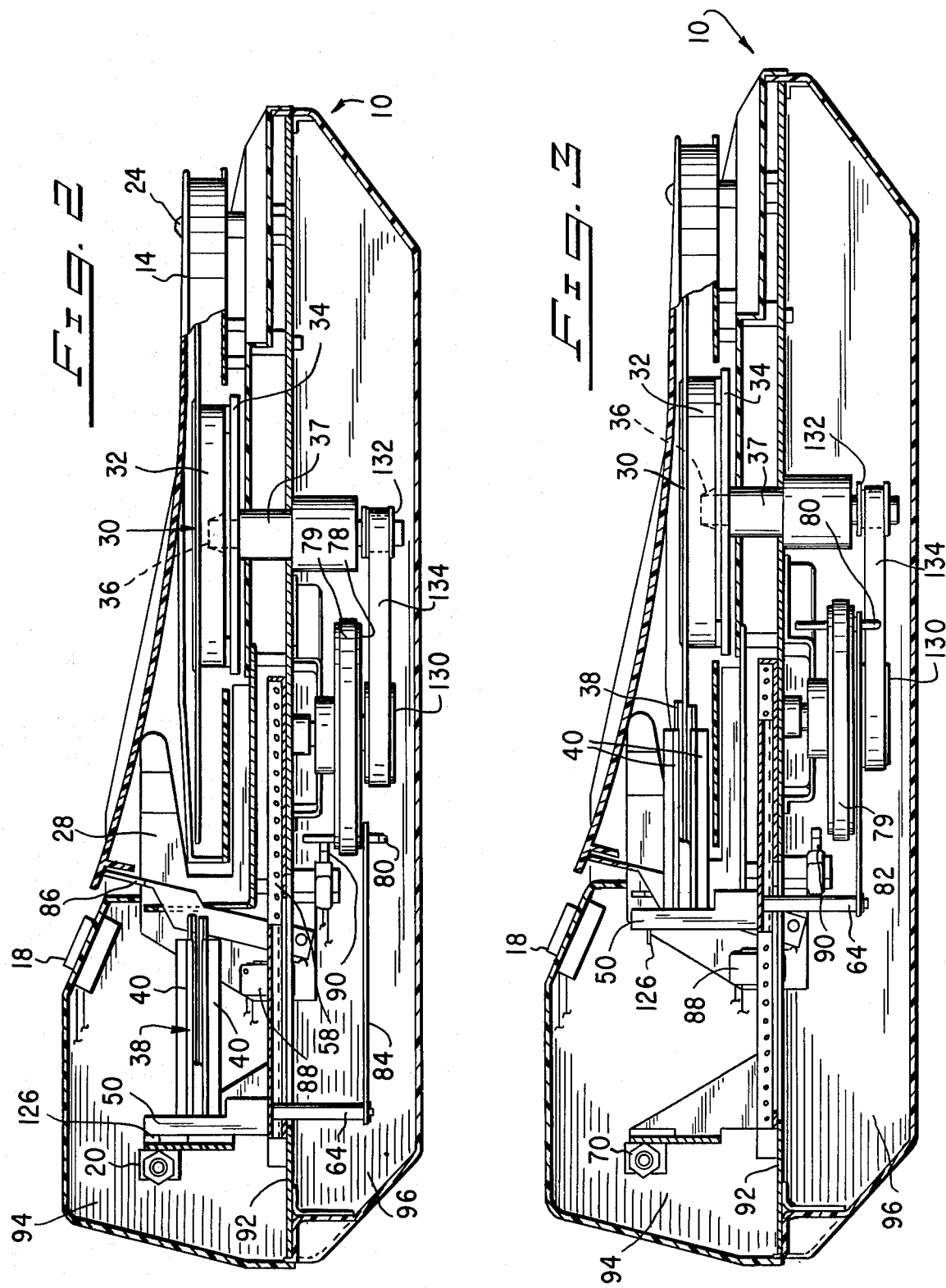

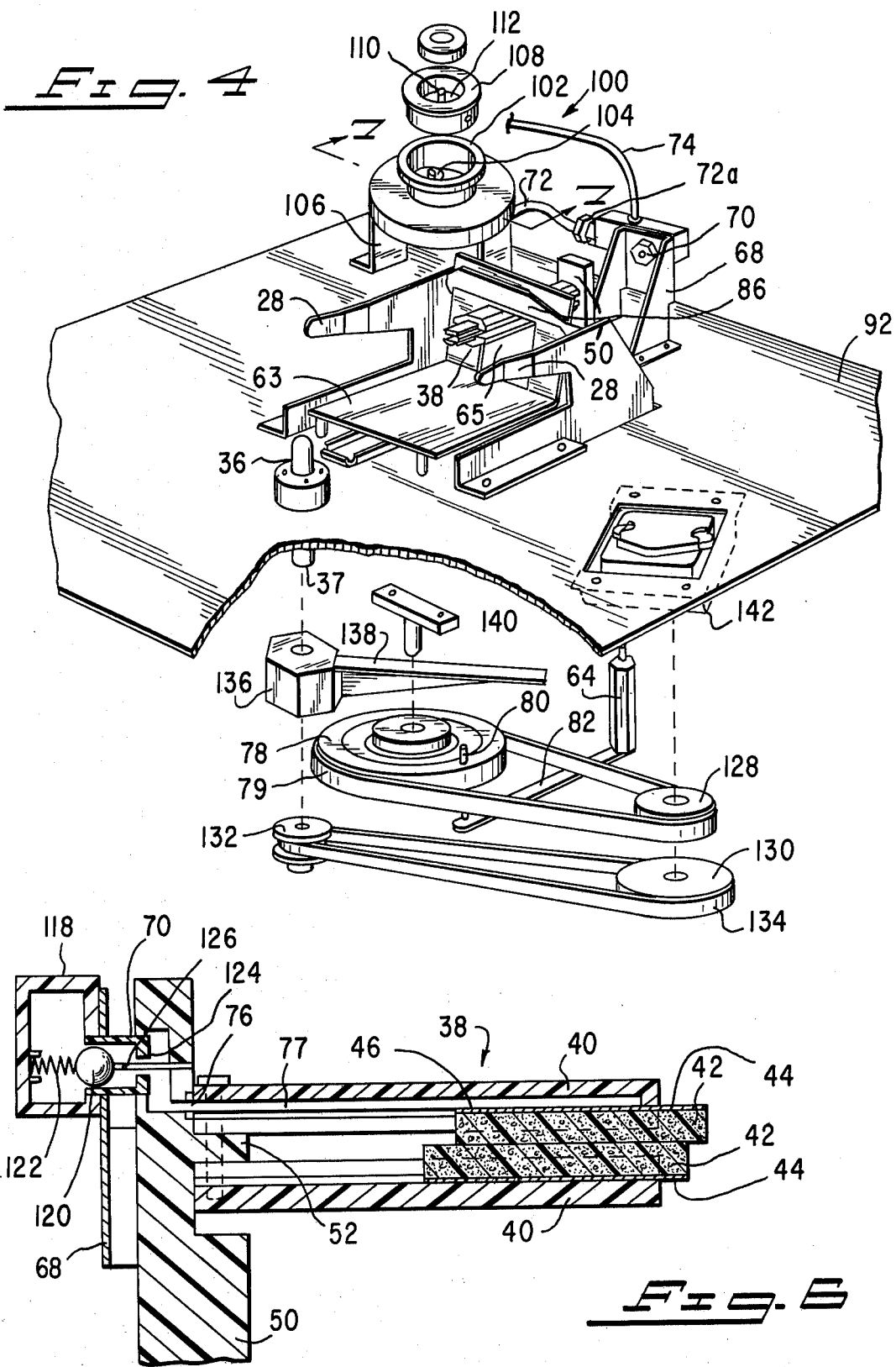

MAGNETIC DISC CLEANING MACHINE

BACKGROUND OF THE INVENTION

1. Field of the Invention

The present invention relates to the field of disc cleaning machines, and more specifically, to a machine adapted for removing undesirable material from a magnetic disc surface without the need to remove the disc from its associated cartridge.

2. Prior Art

The need for regular disc maintenance is widely recognized by data processing users. One particular reason for such need relates to the fact that the information stored on a typical magnetic disc is often times much more valuable than the disc itself. For example, the loss of a single bit of information can lead to a lengthy and expensive data reconstruction process. Accordingly, in order to insure that no information is lost from the disc, users of such discs have taken various measures such as air filtration systems, sealed disc cartridge assemblies and the like in an attempt to prevent contamination from accumulating on the magnetic disc surfaces. Even with such measures, it has been found that there is still a need to clean the disc as small particles of undesirable materials find their way to the surface of the disc.

With this as a background, cleaning of the disc must be done in such a manner that no possible damage occurs to the disc and thus to the information disposed thereon. Prior art cleaning methods have been somewhat at odds with maintaining the information on the disc. For example, if too much force is applied to the disc, it could be scratched. If a liquid is used, the disc may have to be removed from the cartridge thus increasing the likelihood of damage to the disc. Of course, on the other hand, unless the disc is properly cleaned, dust, dirt and other undesirable material can build up on the disc which may prevent such disc from functioning properly, and may in fact lead ultimately to the destruction of the information on the disc.

While the need to maintain magnetic discs is recognized throughout the industry, another major drawback has been the lack of a machine that is truly cost effective. In the past, such machines were extremely complex, and even those machines that were effective in the removal of undesirable material such as dust, cigarette smoke, microscopic oil particles, oxide redeposits, paper bits and the like, such machines were so expensive that they were only used in specific situations.

It is also recognized in the art that after using the disc approximately 20 times, the disc should be cleaned in order to remove the build up of undesirable material. The present invention enables the disc to be repeatedly cleaned without damage to the magnetic disc. This is especially important in view of the new advances associated with use of magnetic discs. In the newer machines, the disc travels at an extremely high rate of speed, 2400-2600 RPMs. The head moves at a distance of approximately 50 micro-inches from the surface of the disc. Under these conditions, a particle of cigarette smoke which ranges in size of up to 200 micro-inches can cause a crash as the head moves over the disc. Thus, there is a need for a machine which is capable of removing such extremely fine particles.

Another problem associated with the failure of prior art machines to properly clean the magnetic disc is the fact that a user may often run long periods of time without experiencing a failure due to a contaminated disc. As the disc begins to deteriorate, it experiences "track reassignments"; a hardware and software method of bypassing bad spots. The user whose disc has run out of alternate recording tracks, or where debris build-up actually causes a head crash, risks the possibility of destroying the disc and thus forever losing the information disposed thereon. The present invention overcomes this problem by providing a machine which substantially cleans the disc and prevents the above-identified deterioration problems.

The present invention is directed to overcoming the problems associated with the prior art magnetic disc cleaning machines, and provides a magnetic disc cleaner which is cost effective and which is further capable of removal of even microscopic particles from the disc. The present invention also performs such cleaning in a manner so as to prevent any possible damage to the disc and thus preserves the information disposed thereon. Finally, the present invention, because of its specific configuration, is adapted to clean the magnetic disc without removal of the disc from the disc cartridge.

BRIEF SUMMARY OF THE INVENTION

The present invention relates to a machine used to clean magnetic discs, and more specifically, to a machine which is adapted to clean a magnetic disc without removal of the disc from its protective cartridge. To further emphasize the value of such magnetic disc, a separate field of art has been evolved which contemplates the construction of various magnetic disc cartridge assemblies which are used to specifically position the magnetic disc and which allow the information to be obtained from the disc without removal of the disc from the cartridge. The present invention is thus directed to a machine which enables the disc to be cleaned while in the cartridge, but which effectively cleans the disc by removing various contaminants therefrom.

The machine comprises a housing having a first reference surface for receiving the magnetic disc cartridge and a turntable positioned adjacent the first reference surface of the housing. The turntable is adapted to selectively rotate the magnetic disc while in the magnetic disc cartridge. A cleaning assembly is also disposed in the housing and includes at least one arm member having an associated cleaning pad. Means for selectively moving the arm member and associated cleaning pad across the disc are disposed in the housing and are coupled to the assembly such that as the cleaning assembly is moved across the disc, the cleaning pad engages the surface of the disc and removes dirt, dust and other undesirable materials therefrom.

It has been found that in order to fully and completely remove various undesirable materials from the magnetic disc, it is beneficial if the pads contain a cleaning liquid. Accordingly, a liquid supply system is also disposed in the housing and is coupled to the cleaning assembly. The liquid supply system supplies a predetermined amount of a cleaning liquid to each of the cleaning pads whereby the cleaning action is substantially increased.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 2 is a cut-away view of FIG. 1, taken along lines 2—2 and showing the interior of the cleaning machine;

FIG. 3 is a second cut-away view of FIG. 1 showing the cleaning pad assembly engaging an associated magnetic disc;

FIG. 4 is an exploded perspective view showing the driving means used to activate the cleaning pad assembly;

FIG. 6 is a cut-away view of the cleaning pad assembly and liquid supply system;

DETAILED DESCRIPTION OF THE INVENTION

Figure 1:
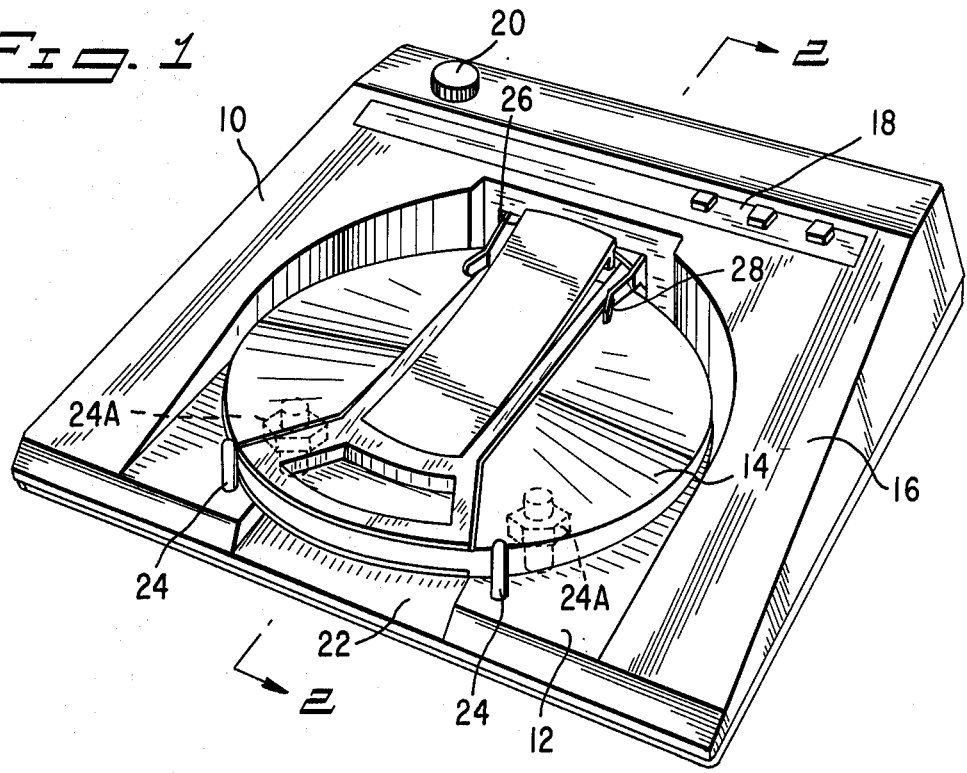
FIG. 1 is a perspective view showing the cleaning machine of the present invention.

Referring first to FIG. 1, the magnetic disc cleaning machine is clearly shown. The machine has a plastic housing 10 which has a first generally flat surface 12 for receiving an associated magnetic disc cartridge 14. The specific configuration of the magnetic cartridge 14 is not considered within the scope of the present invention, and a variety of configurations are well known in the art. In the particular embodiment shown, the magnetic disc cartridge 14 has a generally cylindrical configuration with the magnetic disc axially disposed therein. It should be noted that in a typical magnetic disc cartridge 14, the magnetic disc is positioned in such a manner that it is rotatable in the cartridge 14, but it is only through a time consuming procedure that one could remove the magnetic disc from the cartridge 14. Moreover, because the information on the disc is usually extremely valuable, and further because handling of the disc is likely to cause oils and other contaminants to be more readily disposed on the disc, removal of the disc from the cartridge 14 is contraindicated.

Housing 10 has a generally inclined top panel 16 which surrounds the disc receiving surface 12. Disposed adjacent one end of the top panel 16 is a control panel 18. Control panel 18 is adapted to selectively activate the cleaning action of the machine as hereinbelow described. In the same general area as the control panel 18, is a liquid tank cap 20 which can be removed such that a cleaning liquid can be disposed into an associated supply reservoir in the housing 10.

Disposed adjacent the front of the housing 10 and extending into the receiving surface 12 is a slot 22 which permits the user to easily insert and remove the associated magnetic disc cartridge 14 from the machine. Posts 24 and 24A are also disposed on the surface 12 which further help position the magnetic disc cartridge 14. Finally, flexible arm members 28 extend out of an opening 26 located adjacent the rear of the surface 12. Arm members 28 extend outwardly across the surface 12 and are configured so as to locate the magnetic disc cartridge 14 and retain the same in a secure position. As discussed hereinabove, because of the need to protect the magnetic disc, the machine has the above referenced plurality of positioning means which are very useful in order to insure that the machne does not damage the magnetic disc. This manner of positioning the magnetic disc cartridge 14, and thus the magnetic disc, represents a significant improvement over prior art cleaning machines.

Referring now to FIGS. 2 and 3, one can see the general interior appearance of the housing 10. FIG. 2 shows the magnetic disc 30 as being axially rotatable and disposed within the magnetic disc cartridge 14. Such magnetic disc 30 typically has a spool member 32 which is rotatably positioned in the housing 10 such that an associated turntable 34 may enter the cartridge 14 and engage the spool 32. In this manner, the disc 30 may be selectively rotated while the magnetic disc cartridge 14 remains securely in position. This enables the disc 30 to be cleaned without the need for removal of the same from the disc cartridge 14.

One can see in FIGS. 2 and 3 that the turntable 34 is positioned on a rotatable spindle 36 which is coupled to shaft 37. Also shown in these figures is a cleaning assembly generally referred to by numeral 38. In the presently preferred embodiment, cleaning pad assembly 38 is comprised of first and second arm members 40 which are positioned in a substantially horizontal and in a face-to-face configuration. The cleaning pad assembly 38 further includes a support member 50 for positioning each of the arm members 40 and, upon activation of the machine, moves the arm members 40 from a point generally within the housing to a point exterior thereof as shown in FIG. 3. When in this latter configuration, the arm members 40 engage the disc 30 therebetween.

A further review of FIGS. 2 and 3 shows that the housing 10 has a mounting panel 92 disposed therein which divides the housing 10 into a top section 94 and a bottom section 96. The above referenced cleaning pad assembly 38 is generally disposed in the top section 94 while the various means used to drive the turntable 34 as well as the cleaning assembly 38 are disposed in the bottom section 96.

Figure 5:
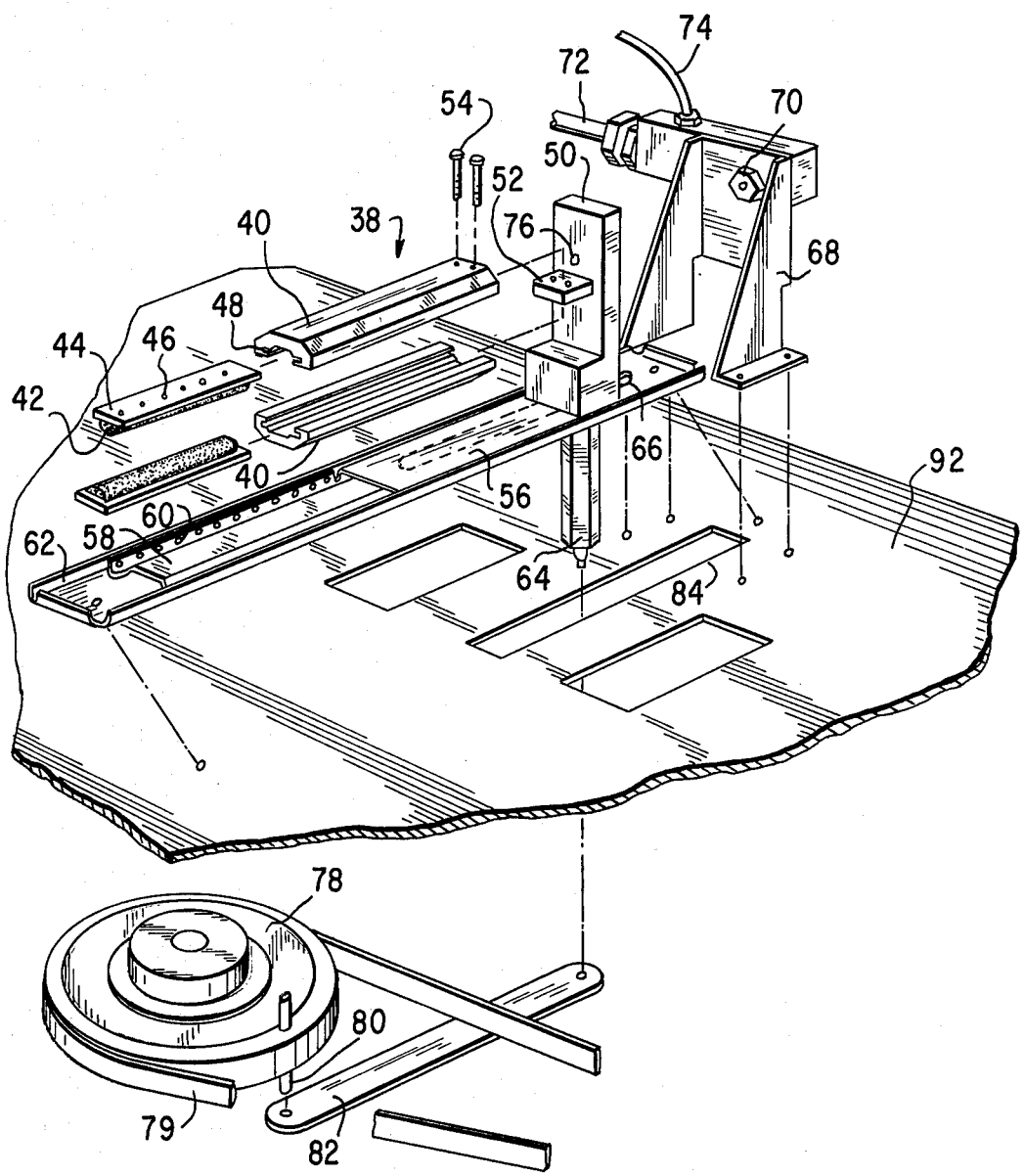
FIG. 5 is another exploded perspective view showing the fine detail of the cleaning pad assembly.

Referring now to FIGS. 4, 5 and 6, the cleaning pad assembly 38 is shown in more detail. As discussed hereinabove, the cleaning pad assembly 38 is comprised of first and second outwardly extending arm members 40 each of which has a foam cleaning pad 42 coupled thereto. Foam pad 42 operates as the scrubbing head or wiping head of the cleaning pad assembly 38. In the preferred embodiment, pads 42 are manufactured of a sponge-like synthetic material, such as polyurethane, which is sufficiently porous such that a liquid is readily absorbed, and then released when squeezed. The foam pads 42 are coupled to a mounting plate 44 which has a plurality of holes 46 disposed along the length thereof. Holes 46 are arranged and configured such that a liquid can readily flow through such holes 46 and be absorbed by the foam pads 42. As shown in FIG. 5, the mounting plate 44 is slideably inserted into the associated arm member 40 along slot 48. Slot 48 permits the mounting plate 44 and associated foam pad 42 to be easily removable therefrom such that changing the foam pad 42 is easily achieved. The arm members 40 are coupled to upright support member 50, and more specifically are coupled to a cantilevered section 52 via pin members 54. Pin Members 54 extend through the cantilevered section 52 and thereby join the upper and lower arm members 40 together so to be in a substantially parallel but spaced apart configuration.

Referring to FIG. 6, one can see that the foam pads 42 are of sufficient thickness such that when the arm members 40 are coupled to the cantilevered section 52, the foam pads 42 are in a touching relationship. However, flexibility of the foam pad is selected such that the magnetic disc 30 readily passes thereinbetween. The friction, however, created during such action is sufficient to while not damage the disc 38, permits the foam pads 42 to pick up dirt, dust and other undesirable materials.

Referring again to FIG. 5, one can see that the support 50 is disposed on a first moveable plate 56 which is slideably disposed along a second moveable plate 58. Plate 58 in turn is slideably disposed in a stationary slotted plate 62. To encourage the movement of the first moveable plate 56 and the second moveable plate 58, the second moveable plate 58 has two sets of bearings 60 along the each side thereof. Bearing 60 engage opposite sides of first moveable plate 56.

Referring now to FIGS. 4 and 5, one can see that the support member 50 is coupled to a pin member 64 which pin member 64 extends through an opening 84 in the mounting plate 92. Pin member 64 extends upward through a slot 66 which is disposed along the length of stationary plate 62. In this manner, pin member 64 is selectively moveable along the length of plate 62. As shown specifically in FIG. 4, in the preferred embodiment, a cover plate 63 is coupled to the mounting plate 92 and has an opening 65 through which the cleaning pad assembly 38 selectively enters and exits.

While it has been found that the cleaning pad assembly 38 and more specifically, the foam pads 42, exhibit desirable cleaning action on an associated magnetic disc 30 when the magnetic disc is selectively rotated so as to pass between such foam pads 42, it has also been found that this action alone can be significantly improved upon in terms of removing dirt, dust and other undesirable material by the use of a cleaning liquid. Accordingly, a liquid supply system 100 is also disposed in the housing 10 and is shown with respect to FIGS. 4–7. Referring first to FIG. 4, one can see a mounting bracket 68 disposed generally behind the support member 50. Such bracket 68 has a valve member 70 disposed therethrough which valve member 70 is coupled to a reservoir tank 102 via a liquid supply conduit 72. In order to insure the proper feed of the cleaning liquid from the tank 102 to the tank 70 and further to prevent possible flow problems, an air conduit 74 is also joined to the valve 70 and to the tank 102.

Referring now to FIGS. 5 and 6, one can see that the support member 50 includes a feed opening 76 which is joined to a stem member 126 (see also FIG. 3) which can be selectively inserted into the valve 70. In this manner, liquid from within the valve 70 is allowed to flow outwardly therefrom around stem 126 and through feed opening 76 along channel 77 where it is caused to flow through the various holes 46 disposed on the mounting plate 44. In this manner, the cleaning liquid is permitted to flow out to the cleaning pads 42 and hence, as described hereinbelow, is used to help remove undesirable material from the magnetic disc 30. It is noted that in the preferred embodiment only one channel 77 is disposed on the upper arm member 40. While other configurations are of course within the scope of this invention, it is found that the mere contact of the two foam pads 42 is sufficient such that when the cleaning liquid is supplied to the upper foam pad, excess liquid readily flows therethrough and is absorbed by the lower foam pad.

Figure 7:
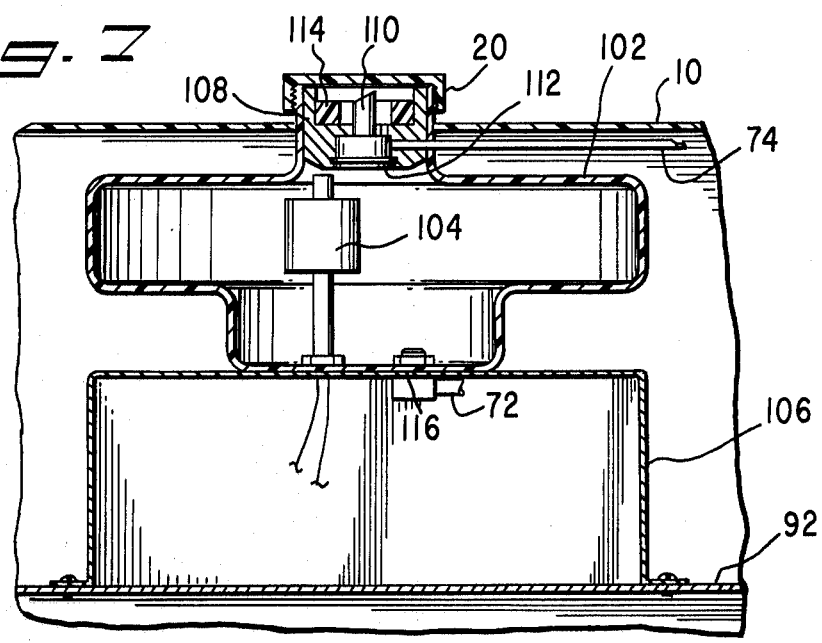
FIG. 7 is a cut-away view of the liquid reservoir which is coupled to the liquid supply system.

Referring now specifically to FIGS. 4 and 7, the liquid suply system 100 of the present invention is shown to include reservoir tank 102 which has a float member 104 disposed therein. Float member 104 is electrically coupled to the display panel 18 such that the presence or absence of liquid in the reservoir tank 102 is indicated on the control panel 18. Axially disposed in the reservoir tank 102 is a liquid receiving and filter section 108 which includes a port 110 and a screen 112. Further, a washer 114 is disposed in the filter section 108 and in this manner a specifically formulated cleaning liquid can be transferred into the reservoir tank 102 from a sealed shipping bottle while effectively preventing slight impurities and particulate matter from flowing to the cleaning assembly 38. The need for this filtration system is recognized when one considers the degree of care which must be exercised when cleaning the magnetic disc 30 in view of the possible damage to the disc and resulting loss of information which could occur. The reservoir tank 102 is coupled to the mounting plate 92 via bracket 106. Liquid supply conduit 72 is joined to tank 102 by an opening 116 adjacent the bottom thereof.

As shown in FIG. 6, a supply or metering tank 118 is disposed adjacent the valve 70 and holds sufficient cleaning liquid such that a predetermined amount of said cleaning liquid is permitted to flow into the cleaning pad assembly 38 as hereinbelow described. FIG. 6 also shows the fine detail of the valve assembly which includes a ball member 120, associated spring 122 and port 124. One can see that as the stem 126 is inserted into port 124, the ball member 120 is pushed away from the port and liquid enters around the stem 126 and ultimately flows on through channel 77 to the foam pads 42.

The tank 118 is configured to hold a specific amount of cleaning liquid and forms part of a uniquely designed liquid metering system. Another part of such system is valve 72a coupled to conduit 72. Valve 72a permits a slow feeding of the cleaning liquid into tank 118 until it is full. When stem 126 enters the valve 70, only that liquid in tank 118 is caused to flow to the foam pad 42. Because the flow rate through the valve 72a is so slow, only extremely minor amounts of the liquid flows into the tank during the time in which the stem 126 is in the valve 70. Of course, other liquid metering systems are within the scope of the invention.

Another important aspect of the present invention is the fact that the cleaning machine enables a specific rotational driving system to be used such that the speed of rotation of the magnetic disc 30 governs the speed the cleaning assembly 38 is advanced across disc 30. It has been found that in this manner the necessary cleaning action can be achieved. This unique driving system will now be discussed and reference is specifically made to FIGS. 4 and 5. As shown in such figures, the pin member 64, which is used to move the support 52, is coupled to a pulley 78 via linkage 82. More specifically, the pin member 64 is coupled to one end of linkage 82 while the pulley 78 is coupled to the other end of linkage 82 via pin member 80. Pin member 80 has first and second sections with the first section joining the pulley 78 to the linkage 82 and with the second section extending upwardly from the pulley 78. Pulley 78, in turn, is driven by an associated belt 79 which is coupled to a first driving pulley 128. One can see that as pulley 78 is rotated, the linkage 82 causes the support member 50 to move along stationary member 62.

In the preferred embodiment, a turntable pulley 132 shown in FIG. 4 is coupled to the shaft 37 of the turntable 34 shown in FIGS. 2 and 3. Pulley 132 is rotated by belt 134 which is coupled to a second driving pulley 130. In order to maintain an accurate and stable rotation of the turntable 34, a bearing assembly 136 and bracket assembly 138 are coupled to plate 92.

Also shown in FIG. 4 is the fact that the pulley 78 includes an idler shaft 140 which is coupled to plate 92. This helps maintain the pulley 78 in a predetermined position. A motor 142 having an associated rotatable shaft is selectively joined to the first driving pulley 128 as well as the second driving pulley 130. Motor 142, when activated selectively causes the rotation of both pulley 128 and 130. In the preferred embodiment, such motor 142 is 1 amp, 110 volt and operates at 60 cycles. Such turntable-type motors are well known in the art, and will not be discussed in detail herein. It is understood, however, that other means for moving the turntable, and cleaning assembly 38 are within the scope of this invention.

The operation of the above-described device will now be presented. When one desires to clean a magnetic disc, the generally circular disc is typically found inside an associated magnetic disc cartridge. Such discs and disc cartridges are well known in the art and will not be discussed in detail herein. However, as pointed out hereinabove, while such discs can be removed from the associated disc cartridge, this would increase the likelihood of damage to the disc, and would further increase the probability that dirt, dust and other like matter would come in contact with the disc. In addition, because of the critical need to preserve the information on the disc, the disc cartridge is designed such that the disc is not readily removable therefrom without substantial disassembly of the cartridge. The present invention overcomes this problem of disassembly as well as provides a machine which enables a cleaning of substantial amounts of undesirable material from the disc without the need for touching the disc with the hands. In fact, the only elements which touches the disc are foam pads. Even then, the engaging action is specifically regulated and controlled, and thus the necessary cleaning action is achieved without damage to the disc.

As shown in FIG. 1, when one desires to clean the disc 30, the associated magnetic disc cartridge 14 is merely slid into position on surface 12 which is configured to receive a plurality of different sized and shaped magnetic disc cartridges. The cartridge 14 is positioned such that an opening in the magnetic disc cartridge 14 is adjacent opening 26 in the housing 10. Proper positioning of the magnetic disc cartridge 14 is encouraged in view of mounting posts 24 and 24A as well as slot 22 which enables one to grasp the otherwise clumsy magnetic disc cartridge 14. In this manner, the disc cartridge 14 is positioned such that the arm members 28 extend over the cartridge 14 and hold it in a predetermined configuration with the opening of the magnetic disc cartridge 14 adjacent the opening 26 of the housing 10.

Reference is now directed to FIGS. 2 and 4 which show the means for activating the machine. It should be noted that another desirable feature of the present invention is that the machine is not activated until a disc cartridge 14 is placed in the housing 10 and even then, further activation is required by means of depressing one of the buttons on the control panel 18. As shown in FIGS. 2 and 4, insertion of the cartridge 14 causes such cartridge to engage moveable bracket 86. As bracket 86 is disposed in a generally upward direction a first switch 88 is selectively activated. Switch 88 is electrically coupled, in the preferred embodiment, to the control panel 18 in such a manner that when cartridge 14 is inserted into the housing 10 so as to cause bracket 86 to move upward, the control panel 18 is activated. In the preferred embodiment, such activation is indicated on the panel by a light disposed within one or more of the button members.

It should be noted that even after the magnetic disc cartridge 14 is inserted into the housing 10, the machine is not activated. Activation only comes about when one of the buttons on the control panel 18 is depressed. Such selective activation system thus enables a checking of the proper insertion of the magnetic disc cartridge 14 so as to insure that the magnetic disc 30, and more specifically, the spool 32 is axially disposed on the spindle 36 of the turntable 34. When proper insertion and alignment is achieved, a button on the control panel 18 may be depressed thus activating the motor 142. Motor 142 drives working pulleys 128 and 130. Rotation of pulley 128 causes belt 79 to drive cleaning assembly pulley 78.

Reference is now made to FIG. 2. In the initial or rest position, the cleaning pad assembly 38 is disposed generally within the housing 10, and more specifically within the top section 94 thereof. The support 50 of the cleaning pad assembly 38 is joined to the pulley 78 via pin member 64 and associated linkage 82. However, from the initial or rest position as shown in FIG. 2, the support 50 is first caused to move towards the rear of the housing 10 upon actuation of the motor 142 such that the stem 126 is disposed into the valve 70 as shown in FIG. 6. In this manner, the predetermined amount of cleaning liquid in the tank 118 is caused to flow around the stem 126, through feed opening 76, along channel 77 and ultimately through holes 46 to the foam pads 42.

As pulley 78 continues to rotate, the stem 126 will ultimately disengage the valve 70 permitting ball member 120 to close off the port 124 in the valve 70. During the rest of the cycle, cleaning liquid from reservoir tank 103 flows into tank 118. Continued rotation of the pulley 78 causes the cleaning pad assembly 38 to begin to exit out through opening 65 and across plate 63. Ultimately, the cleaning pad assembly 38 begins to enter into the magnetic disc cartridge 14 and engages the magnetic disc 30 as is shown in FIG. 3. As the disc 30 continues to rotate, the cleaning action of the foam pads 42 which are proceeding radially inward from a point adjacent the rim of the disc 30, pick up particles of dust, dirt and even microscopic particles of cigarette smoke and the like thus achieving a complete cleaning action. In the preferred embodiment, the pads 42 travel in a straight path from a point adjacent the rim of disc 30 inwardly. Other methods of movements, such as a circular action, and the like are also within the scope of this invention. The cleaning action of the pads 42 is due partially to the friction between the pads 42 and the magnetic disc 30, and also because of the cleaning liquid which encourages the dirt to be retained on the pads 42. Continued rotation of the pulley 78 eventually causes the cleaning pad assembly 38 to be moved back towards the rear of the housing 10.

As shown in FIG. 5, movement of the assembly 38 in and out of the housing 10 is achieved by coupling the assembly 38 to pulley 78 by means of pin member 64 and linkage 82. To help insure that the necessary smooth sliding action of the pad assembly 38 is achieved, the assembly 38 is coupled to a first moveable plate 56 on which support 50 is mounted. As the linkage 82 begins to rotate about pulley 78, pin 64 moves in a substantially linear path along slot 66. Because pin 64 is coupled to support 50 and to plate 56, as pin 64 moves, so does support 50 and plate 56. Plate 56 is encouraged to slide along second moveable plate 58 by means of bearings 60. As the pin member 64 proceeds along slot 66 in plate 62, both the first moveable plate 56 as well as the second moveable plate 58 slide along the length of stationary plate 62. This increased slideability of the cleaning pad assembly 38 has been found to be particularly useful and helps prevent sticking or other undesirable action which would impede the necessary uniform motion of the assembly 38. In this manner, accurate cleaning of the disc 30 is achieved.

Ultimately, the cleaning pad assembly 38 will again be moved towards the rear of the housing 10 until it occupies its original position as shown in FIG. 2. When moved into this position, the pin 80 on the pulley 78 has rotated one complete rotation (360°) and engages a second switch 90 which turns motor 142 into the off position. Movement of the cleaning pad assembly 38 as well as the turntable 34 therefore stop. It shoud be noted that in the first rest position, the stem 126 has not yet engaged the valve 70 and thus no cleaning fluid is caused to flow into the pad 42 until the machine is fully activated.

While the disc cleaning machine of the present invention can work without any cleaning fluid, it has been found that the use of a cleaning liquid achieves superior cleaning in most cases. The present invention therefore couples liquid supply system 100 to the cleaning pad assembly 38. Referring to FIGS. 6 and 7, one can see that when the stem 126 enters into valve 70, the cleaning fluid flows from supply tank 118 to pads 42. In the preferred embodiment, reservoir tank 102 holds sufficient cleaning liquid for up to about 100 cleaning cycles. To insure a continuous flow of liquid from reservoir tank 102 to supply tank 118, an air conduit 74 also joins these two tanks together. It has also been found, given the need for extremely clean conditions so as to minimize damage to the disc 30, that a filter system in the tank 102 is beneficial. In the preferred embodiment, a screen 112 of a small mesh size is disposed over the orifice of tank 102 so as to prevent small impurities from either clogging liquid conduit 72 or from finding their way to pads 42. Another desirable feature associated with liquid supply system 100 is that it is electrically coupled to the control panel 18. When float 104 goes below a predetermined level, such information is transmitted to panel 18. The user can then easily remove cap 20 and add more cleaning liquid to reservoir tank 102.

Finally, as shown in FIGS. 2, 3 and 4, the second driving pulley 130, which is in axial alignment with the first driving pulley 128, is coupled to the turntable pulley 132 via belt 134. In this manner, the rotation of the turntable 34 is rendered directly related to the speed with which the cleaning assembly 38 engages the magnetic disc 30. It has been found that a preferred speed of three revolutions per minute of the disc 30 causes the pad assembly 38 to move with sufficient speed but with the necessary cleaning action to take place. Under this type of an arrangement, the entire cleaning operation can be completed unattended in approximately three minutes.

As shown with respect to FIG. 1, in the preferred embodiment, the control panel 18 includes three buttons, a first being a lighted "power" button which would indicate that the cartridge 14 had caused bracket 86 to activate switch 88, a second "add fluid" light which is electrically coupled to the float 104 in the liquid supply system 100, and third "process" button which can be selectively depressed so as to activate the motor 142.

It should be understood that while the preferred example described hereinabove deal with specific shapes, other configurations can be used, using the same principals. It will therefore be apparent to one skilled in the art that other changes and modifications can be made without departing from the spirit or scope of the present invention as defined in the claims herein. For example, while in the preferred embodiment foam-type cleaning pads 42 are used to engage the magnetic disc 30, other similarly shaped or brustled type cleaning brushes can also be used. Moreover, while the preferred embodiment shows the use of upper and lower arm members 40 each having an associated foam pad 42, when it is desirable only to clean one side of the disc 30, one of the arm members 40 can be easily removable from the assembly 38. It is thus within the scope of the invention to use the machine with only one such arm member. Finally, while the liquid supply system as disclosed hereinabove is shown to be particularly adapted for the use in this invention, other liquid supply systems for supplying liquid to the cleaning pad assembly 38 are also within the scope of this invention. Such liquid supply system could include the application of the cleaning liquid directly to the assembly 38 by means of a detached system, i.e. a bottle or the like.

I claim:

1. A magnetic disc cleaning machine for removing dirt, dust and other undesirable material from a magnetic disc surface comprising:
   (a) a housing having outwardly extending flexible members configured to selectively engage a magnetic disc cartridge containing said magnetic disc; and
   (b) a cleaning pad assembly disposed on said housing and including (i) at least one arm member having an associated cleaning surface and (ii) means for selectively moving said arm member and associated cleaning surface across said disc such that as said surface is moved across said disc, said cleaning surface engages a surface of said disc and removes dirt, dust and other undesirable material therefrom.

2. A magnetic disc cleaning machine according to claim 1 wherein said arm member moves radially inward across said disc from a point adjacent the rim of said disc.

3. A magnetic disc cleaning machine according to claim 1 wherein said cleaning surface is made of a sponge-like material.

4. A magnetic disc cleaning machine according to claim 1 wherein said cleaning assembly includes first and second arm members each having an associated cleaning surface, said arm members and associated cleaning surface configured such that said magnetic disc passes thereinbetween.

5. A magnetic disc cleaning machine according to claim 1 wherein said means for positioning and receiving said magnetic disc includes a turntable disposed in said housing for selectively rotating said disc.

6. A magnetic disc cleaning machine according to claim 5 wherein said means for moving said arm member is coupled to said turntable such that as said turntable rotates, said arm member is caused to move across said magnetic disc.

7. A magnetic disc cleaning machine according to claim 1 wherein a liquid supply system is coupled to said cleaning assembly, said liquid supply system for supplying a cleaning liquid to said cleaning surface whereby undesirable material is further encouraged to be removed from said magnetic disc.

8. A magnetic disc cleaning machine according to claim 7 wherein said liquid supply system includes (i) a holding tank for said cleaning liquid; (ii) valve means for selectively engaging said cleaning assembly and thereby supplying said cleaning surface with a predetermined amount of said cleaning fluid; and (iii) a conduit coupling said holding tank to said valve means.

9. A magnetic disc cleaning machine for removing dirt, dust and other undesirable material from a magnetic disc located in an associated magnetic disc cartridge comprising:
(a) a housing having a first surface for receiving said magnetic disc cartridge and a turntable positioned adjacent said first surface of said housing, said turntable for selectively rotating said magnetic disc, said housing further having flexible members for selectively engaging a magnetic disc cartridge;
(b) a cleaning assembly disposed on said housing and including (i) at least one arm member having an associated cleaning pad and (ii) means for selectively moving said arm member and associated cleaning pad across said disc such that as said cleaning pad is moved across said disc, said cleaning pad engages a surface of said disc and removes dirt, dust and other undesirable material therefrom; and
(c) a liquid supply system coupled to said cleaning assembly, said liquid supply system for supplying a cleaning liquid to said cleaning pad whereby undesirable material is further encouraged to be removed from said magnetic disc.

10. A magnetic disc cleaning machine according to claim 9 wherein said arm member moves radially inward across said disc from a point adjacent the rim of said disc.

11. A magnetic disc cleaning machine according to claim 9 wherein said cleaning assembly includes first and second arm members each having an associated cleaning pad, said arm members and associated pads configured such that said magnetic disc passes thereinbetween.

12. A magnetic disc cleaning machine according to claim 9 wherein said liquid supply system includes (i) a holding tank for said cleaning liquid; (ii) valve means for selectively engaging said cleaning assembly and thereby supplying each said cleaning pad with a predetermined amount of said cleaning fluid; and (iii) a conduit coupling said holding tank to said valve means.

13. A magnetic disc cleaning machine for removing dirt, dust and other undesirable material from a magnetic disc comprising:
a housing having a first surface for receiving a magnetic disc cartridge with said magnetic disc axially disposed therein, a turntable for selectively rotating said magnetic disc, and an opening adjacent said first surface through which a moveable cleaning assembly selectively passes;
said cleaning assembly having (i) first and second arm members, each said arm member having an associated sponge-like cleaning pad coupled thereto, said arm members configured such that said magnetic disc passes thereinbetween and is engaged by said cleaning pads; and (ii) means for moving said arm members and associated cleaning pads across said magnetic disc from a first retracted position generally within said housing to a second extend position exterior from said housing; and
a liquid supply system selectively coupled to said cleaning assembly, said liquid supply system for supplying a predetermined amount of a cleaning liquid to said cleaning pads.

14. A magnetic disc cleaning machine according to claim 13 wherein rotation means for rotating said turntable are disposed in said housing, said rotation means coupled to said means for moving said arm members such that as said rotation means rotates said turntable, said arm members are moved into contact with said magnetic disc.

15. A magnetic disc cleaning machine according to claim 13 wherein said housing includes gripping means for engaging said magnetic disc cartridge.

16. A magnetic disc cleaning machine according to claim 13 wherein said housing has a control panel for selectively activating said turntable and said cleaning assembly.

17. A magnetic disc cleaning machine according to claim 16 wherein switching means is disposed adjacent said opening on said housing and configured such that upon insertion of said magnetic disc cartridge, said switching means activates said control panel.

18. A magnetic disc cleaning machine according to claim 13 wherein said liquid supply system includes (i) a holding tank for said cleaning liquid; (ii) valve means for selectively engaging said cleaning assembly and thereby supplying each said cleaning pad with a predetermined amount of cleaning fluid; and (iii) a conduit coupling said holding tank to said valve means.

19. A magnetic disc cleaning machine according to claim 18 wherein said valve means is configured such that upon engagement with said cleaning assembly, a cleaning liquid is caused to travel through said valve means and into said cleaning assembly.

20. A magnetic disc cleaning machine according to claim 18 wherein said arm members, in said first retracted position, are disposed adjacent said valve means whereby, upon activation of said cleaning assembly, said cleaning assembly is caused to first move towards and engages said valve means where a predetermined amount of cleaning fluid travels to each of said pads, and then towards said magnetic disc.

* * * * *